(12) United States Patent
Shapiro et al.

(10) Patent No.: US 11,461,441 B2
(45) Date of Patent: Oct. 4, 2022

(54) MACHINE LEARNING-BASED ANOMALY DETECTION FOR HUMAN PRESENCE VERIFICATION

(71) Applicant: EMC IP Holding Company LLC, Hopkinton, MA (US)

(72) Inventors: Dany Shapiro, Alfi Menashe (IL); Shiri Gaber, Beer Sheva (IL); Ohad Arnon, Beit Nir (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 16/401,616

(22) Filed: May 2, 2019

(65) Prior Publication Data
US 2020/0349241 A1 Nov. 5, 2020

(51) Int. Cl.
*H04L 29/06* (2006.01)
*G06F 21/31* (2013.01)
(Continued)

(52) U.S. Cl.
CPC .......... *G06F 21/316* (2013.01); *G06F 21/552* (2013.01); *G06N 20/00* (2019.01)

(58) Field of Classification Search
CPC .......... H04L 9/00; H04L 63/00; H04W 12/00; G06F 21/00; G06F 21/316; G06F 21/552;
(Continued)

(56) References Cited

U.S. PATENT DOCUMENTS

2003/0220767 A1\* 11/2003 Wegerich ............. G05B 23/024
702/182
2014/0156231 A1\* 6/2014 Guo ...................... G06N 7/005
703/2
(Continued)

OTHER PUBLICATIONS

U.S. Appl. No. 16/145,536 entitled, "System Operational Analytics Using Normalized Likelihood Scores", filed Sep. 28, 2018.

*Primary Examiner* — Joseph P Hirl
*Assistant Examiner* — Leynna Truvan
(74) *Attorney, Agent, or Firm* — Ryan, Mason & Lewis, LLP

(57) ABSTRACT

Techniques are provided for machine learning-based anomaly detection in a monitored location. One method comprises obtaining data from multiple data sources associated with a monitored location for storage into a data repository; processing the data to generate substantially continuous time-series data for multiple distinct features within the data; applying the substantially continuous time-series data for the distinct features to a machine learning baseline behavioral model to obtain a probability distribution representing a behavior of the monitored location over time; and evaluating a probability score generated by the machine learning baseline behavioral model to identify an anomaly at the monitored location. The machine learning baseline behavioral model is trained, for example, to identify anomalies in correlations between the plurality of distinct features at each timestamp. A presence verification is optionally provided based on a deviation from the machine learning baseline behavioral model at the monitored location.

20 Claims, 6 Drawing Sheets

(51) Int. Cl.
  *G06N 20/00* (2019.01)
  *G06F 21/55* (2013.01)
(58) Field of Classification Search
  CPC .... G06N 20/00; G06K 9/6267; G06K 9/6289;
         G06V 40/10; G06V 40/172; G08B 13/00;
                                  G08B 29/186
  See application file for complete search history.

(56) References Cited

U.S. PATENT DOCUMENTS

| | | | |
|---|---|---|---|
| 2016/0351031 A1* | 12/2016 | Jo | G08B 13/19684 |
| 2017/0063890 A1* | 3/2017 | Muddu | G06F 3/04847 |
| 2017/0094592 A1* | 3/2017 | Tabatabaei | H04W 48/16 |
| 2018/0068172 A1* | 3/2018 | Despiegel | G06V 20/52 |
| 2018/0115578 A1* | 4/2018 | Subbarayan | G06N 20/00 |
| 2018/0121539 A1* | 5/2018 | Ciulla | G06F 16/3344 |
| 2018/0122506 A1* | 5/2018 | Grantcharov | A61B 5/0022 |
| 2018/0248902 A1* | 8/2018 | D Nil-Dumitrescu | G06N 3/02 |
| 2019/0158340 A1* | 5/2019 | Zhang | H04B 17/318 |
| 2020/0125639 A1* | 4/2020 | Doyle | G10L 15/197 |

* cited by examiner

MACHINE LEARNING-BASED ANOMALY DETECTION FOR HUMAN PRESENCE VERIFICATION

FIELD

The field relates generally to the detection of anomalies in a monitored location.

BACKGROUND

There are numerous existing methods for identifying human presence in a monitored location, such as a home or office. For example, presence detection techniques have been proposed or suggested based on infrared detection, radar detection, image recognition, and sensing of audio, temperature and/or motion. Nonetheless, human sensing remains a hard problem to solve due to a number of factors, ranging from inherent noise in outdated hardware devices to an intentional manipulation of sensors by intruders. Thus, false alarms (e.g., where an alarm is triggered by mistake) and missed detection (e.g., where the intruder goes undetected) are still quite common. Among other shortcomings, the existing solutions can typically only be applied with any reliability when the legitimate occupants (e.g., residents and/or owners) are physically away from the monitored location.

A need therefore exists for improved techniques for human presence verification.

SUMMARY

In one embodiment, a method comprises obtaining data from a plurality of data sources associated with a monitored location for storage into a data repository; processing the data to generate substantially continuous time-series data for a plurality of distinct features within the data; applying the substantially continuous time-series data for the plurality of distinct features to at least one machine learning baseline behavioral model to obtain a probability distribution representing a behavior of the monitored location over time; and evaluating a probability score generated by the at least one machine learning baseline behavioral model to identify an anomaly at the monitored location.

In some embodiments, the at least one machine learning baseline behavioral model is trained to identify anomalies in correlations between the plurality of distinct features at each timestamp. A presence verification is optionally provided based on a deviation from the at least one machine learning baseline behavioral model at the monitored location.

Other illustrative embodiments include, without limitation, apparatus, systems, methods and computer program products comprising processor-readable storage media.

DETAILED DESCRIPTION

Figure 1:
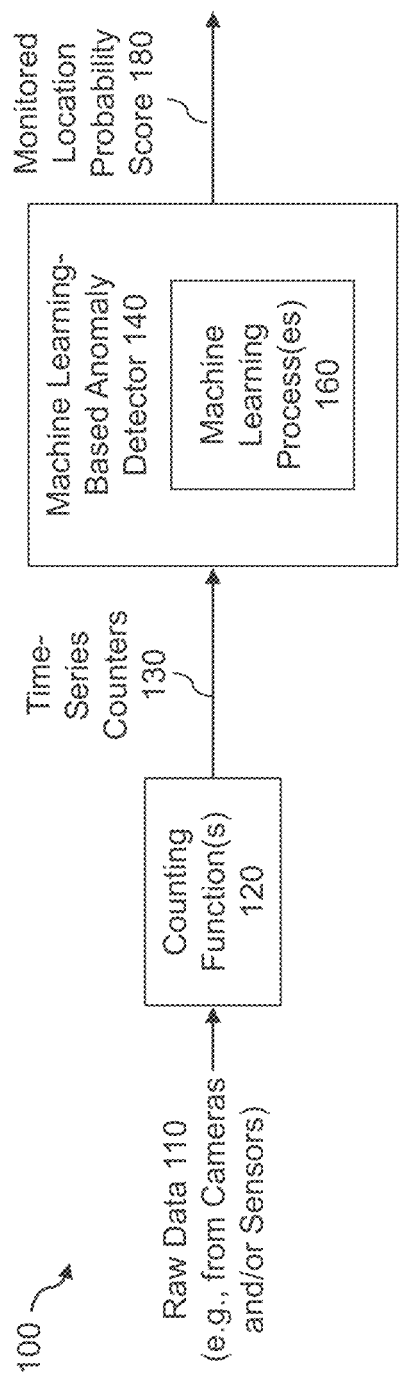
FIG. 1 illustrates an exemplary machine learning-based anomaly detection system for verifying human presence, according to one embodiment of the invention.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for machine learning-based anomaly detection in a monitored location.

In one or more embodiments, machine learning-based techniques are provided for anomaly detection for human presence verification in a monitored location. In some embodiments, the disclosed machine learning-based solution does not require an exact identification of a person, but rather, relies on sensing the image and alerting on anomalies in a temporal-spatial presence of images in the monitored location.

In existing home alert systems, for example, the specific person does not need to be identified. Rather, existing home alert systems identify anomalies with regard to presence, count, location and/or time of persons entering and populating the monitored premise. One or more embodiments of the disclosure recognize that machine learning-based anomaly detection methods can be applied on data arriving from existing sensors and cameras operating substantially constantly to generate a baseline machine learning model for normal activity.

Typically, the required resolution associated with the disclosed machine learning-based techniques for anomaly detection is lower than the resolution normally required for existing facial and identity recognition techniques. Thus, the applied model is significantly lighter and inference can be run, in some embodiments, directly on a computational edge device, such as a Dell Edge Gateway 3000 Series™ computational node, commercially available from Dell EMC of Hopkinton, Mass. Thus, among other benefits, some embodiments of the disclosed anomaly detection techniques demonstrate a reduction in the solution latency without compromising accuracy, since communication with an external server is not required.

The recent growth in the home security system market is often primarily attributed to the emergence of Internet of Things (IoT) technologies and the incorporation of artificial intelligence and DL (Deep Learning) in evolving solutions. Existing methods for identifying and alerting on human presence include, for example:

1) Infrared and radar detectors;
2) Image recognition;
3) Sensors for volume, temperature, motion and sound sensing;
4) Pressure sensitive floor tiles; and
5) Capturing device signals such as a signal from a mobile phone.

As noted above, human sensing is often considered a hard problem to solve due to a number of factors, ranging from, for example, inherent hardware noise to intentional manipulation of sensors by intruders. One limitation comes from the fact that these systems typically alert on any presence identification. Thus, current alerting solutions typically rely on the monitored location being empty and are applied only when humans, legitimate or not, are expected to be out of the monitored location. In this sense, existing solutions are rather coarse and cannot distinguish between authorized users and unauthorized users.

In some embodiments, the disclosed machine learning-based techniques for anomaly detection do not require an exact identification, but rather, rely on sensing the image and alerting on anomalies in a temporal-spatial presence of images in the monitored location.

In home alert systems, for example, it is typically not required to identify the identity of a specific person; rather, anomalies are identified with regard to presence, count, location and time of persons entering and populating the monitored location. One or more embodiments of the disclosure apply anomaly detection methods on data arriving from various sensors and cameras in the monitored location to identify anomalies in the monitored location.

In some embodiments, captured human properties, such as body shape, motion and presence, are collected and utilized to construct a multi-dimensional probability distribution, taking into account the temporal pattern and correlation among different features. In this manner, unexpected events, such as intrusions or even "unexpected visits," are captured as anomalies from the baseline distribution and an alarm can be triggered.

Among other benefits, one or more exemplary implementations have a lighter computational load, due to a lower required resolution than existing face/identity recognition techniques. Thus, the disclosed machine learning-based techniques for anomaly detection can optionally be executed directly on one or more edge devices. Thus, the solution latency is reduced, relative to conventional approaches, without compromising accuracy.

Existing solutions for human sensing are often coarse, in the sense that they alert on any presence within the defined area; thus, they can only be operated when leaving the house, as noted above. For example, any sensor or detector installed as a part of a home alert system is entirely non-selective in their ability to identify any presence, including any "white-listed" personnel allowed to enter the house. This is problematic, for example, due to not being able to operate the security system for periods when residents of the house are asleep, or forgetting to activate the alarm upon leaving the monitored location.

Further, existing face recognition or identity identification solutions are more sensitive in their ability to identify specific faces, yet they are computationally expensive. Thus, such implementations typically require powerful computational hardware. In most cases, however, it is not feasible to acquire and implement such hardware on an edge device. While this problem can be solved by having the analytic solution run on a remote central server, for example, there are additional issues such as dependence on a communication component that can be sabotaged and response latency (while real-time identification is critical).

Human sensing is a challenging endeavor for a variety of reasons (more so than many object detection and sensing tasks). To start with, many sensors are outdated and the same technology has been used for over 30 years. In addition, there are a number of obstacles for accurate human sensing, including sensing noise (e.g., due to the sensor hardware technology), and environmental variations (e.g., variations in heating, ventilation, and air conditioning). Similarly, there is often an appearance variability and unpredictability (e.g., non-rigid bodies subject to any number of poses) and a similarity to other people (e.g., in identity identification applications). Further, there are a number of adversarial scenarios as attacks through which a human sensing system may be fooled or debilitated (e.g., turning a light off to avoid camera detection or walking slowly to fool motion sensors).

Existing solutions typically perform in a similar manner at any given time. For example, once an alarm is activated, a motion sensor will be triggered at any given time if motion is captured somewhere on the monitored premise, even though some motions are legitimate, such as a pet, or the house residents at night. In addition, there may also be a baseline change, e.g., the temperature may change regardless of an intruder presence, potentially triggering the alarm. Another consideration related to the time dimension is the fact that current solutions do not consider the time correlations among different attributes and solely consider individual attributes crossing some threshold. Returning to the examples mentioned above, an existing motion detector may not learn the relation between motion and a count of people in the monitored location, for example. Similarly, an existing motion detector may not learn the correlation between temperature rises to presence of people in the monitored location.

FIG. 1 illustrates an exemplary machine learning-based anomaly detection system 100 for verifying human presence, according to at least one embodiment of the disclosure. As shown in FIG. 1, the exemplary machine learning-based anomaly detection system 100 applies raw data 110, such as data from cameras, sensors and/or IoT devices, to one or more counting functions 120 that generate one or more of time-series counters 130 for a plurality of distinct features within the raw data 110.

The time-series counters 130 are applied to a machine learning-based anomaly detector 140 that comprises one or more machine learning processes 160. In some embodiments, there is a different machine learning model for each distinct feature within the raw data 110, as well as an additional aggregated machine learning model, as discussed further below. Generally, each of the machine learning models are trained using training data for the corresponding feature or features, for example, to learn the temporal and/or spatial behavior for each feature, and the temporal correlation among all features. In some embodiments, a threshold is applied against the output of the aggregated model to identify an anomaly.

The one or more machine learning processes 160 generate a monitored location probability score 180 indicating a likelihood of an intrusion or another anomaly.

Figure 2:
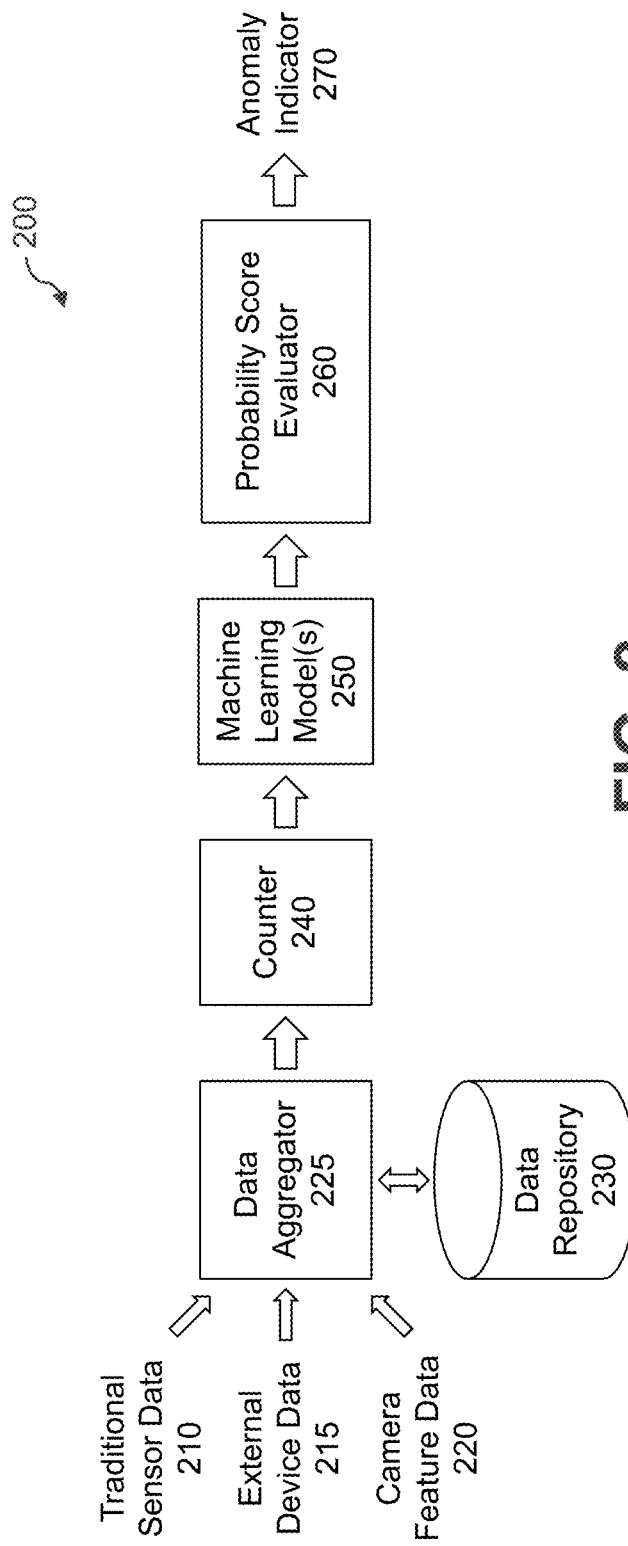
FIG. 2 illustrates an exemplary pipeline for an exemplary machine learning-based anomaly detection system, according to an embodiment of the disclosure.

FIG. 2 illustrates an exemplary pipeline 200 for an exemplary machine learning-based anomaly detection system, according to some embodiments. As shown in FIG. 2, the exemplary pipeline 200 receives one or more of data from traditional sensors 210, data from one or more external devices 215 and camera feature data 220 from one or more cameras. Thus, the raw data 110 of FIG. 1 is generated from different devices, sensor types and triggers. The traditional sensors may include, for example, infrared devices and audio devices (e.g., indicating volume) and the external devices may include, for example, a router, or a smart TV.

The received data 210, 215, 220 is aggregated by a data aggregator 225 that optionally stores the received data 210, 215, 220 (or portions thereof) in a data repository 230 (e.g., a persistent data store and/or centralized queue), for example, for a later forensic analysis. The data aggregator 225 optionally performs a known ETL (Extract Transform Load) function, by which source data is loaded into a data warehouse/repository holding data from multiple data sources.

As shown in FIG. 2, in some embodiments, the aggregated received data 210, 215, 220 is transformed into time-series data using a counter 240. In some embodiments, the counter 240 applies at least one counting function to the aggregated received data 210, 215, 220, to obtain time-series counters for a plurality of distinct features within the aggregated received data 210, 215, 220. One or more aspects of the disclosure recognize that preprocessing the data into substantially continuous time-series data allows temporal patterns to be learned such that individual anomalies in each feature (and/or in the aggregated features) can be identified.

The individual features generated by the counter 240 are integrated as input (e.g., in the form of a data vector with a key performance indicator (KPI) for each time-stamp) to one or more machine learning models 250. In some embodiments, there is a different machine learning model 250 for each distinct feature within the raw data 110, as well as an additional aggregated machine learning model. Generally, the exemplary machine learning model(s) 250 learn the baseline behavior for the expected occupants of the monitored location, for example, for various days of the week, and times of day.

In one or more embodiments, the exemplary machine learning model(s) 250 generate a probability distribution for the system behavior as a whole. As shown in FIG. 2, the current score generated from the probability distribution is processed by a probability score evaluator 260 that determines if an anomaly is present in the monitored location, and generates an anomaly indicator 270, when appropriate (e.g., when an intrusion occurs). The probability score evaluator 260 can make the anomaly decision, based on, for example, one or more of policies, rules, configuration information for the appropriate thresholds.

In at least one embodiment, the received data 210, 215, 220 comprises human observable properties encompassing, for example, information regarding the people in the monitored location. The human observable properties can be divided in two observable categories (e.g., spatio-temporal properties, such as presence, count and location) and physiological static properties (e.g., blood pressure, body temperature and skin color). These properties are captured in some embodiments using existing sensors, such as motion detectors, cameras, sonar and more.

Figure 3:
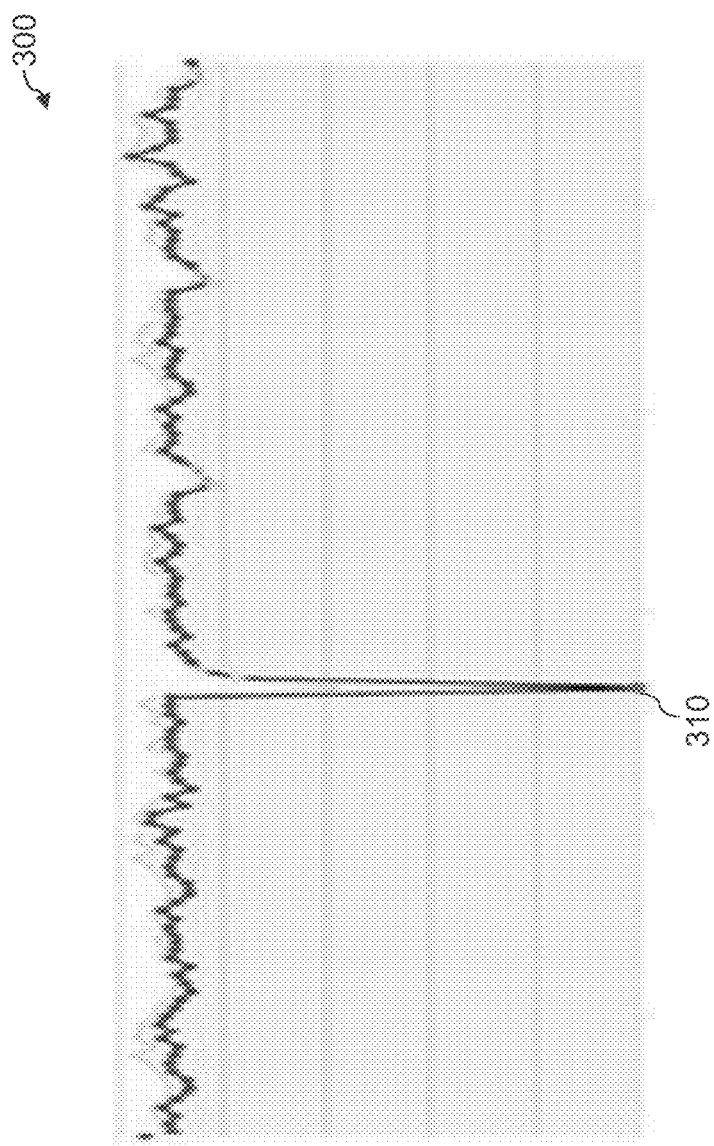
FIG. 3 illustrates an exemplary intrusion score generated by one or more embodiments of the disclosure, according to some embodiments.

FIG. 3 illustrates an exemplary intrusion score 300 generated by one or more embodiments of the disclosure. Generally, as described herein, multiple KPIs in the monitored location are evaluated. As shown in FIG. 3, the multiple KPIs are combined into a single "intrusion score" in some embodiments, using the machine learning models 250. When a specific threshold 310 is crossed, in some embodiments, an alarm (or another predefined remediation action) is optionally triggered.

Figure 4:
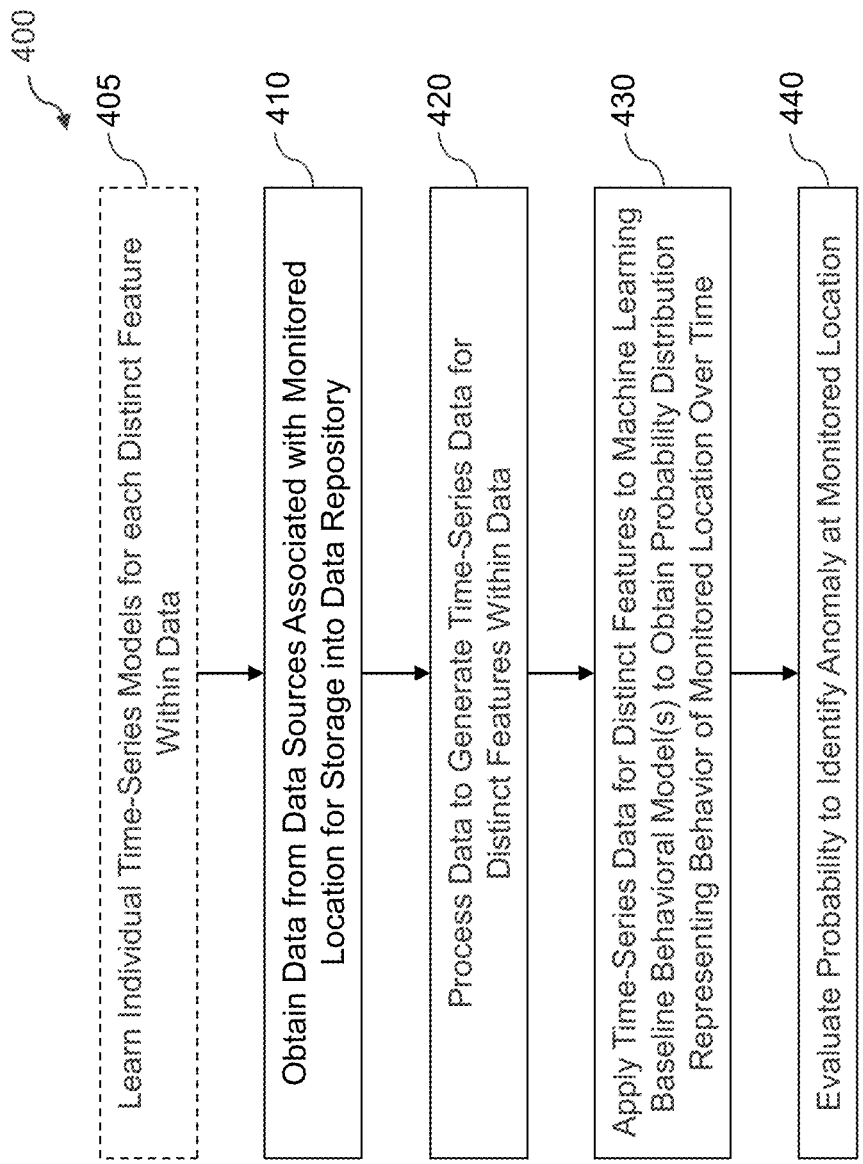
FIG. 4 is a flow chart illustrating an exemplary implementation of a machine learning-based anomaly detection process, according to some embodiments of the disclosure.

FIG. 4 is a flow chart illustrating an exemplary implementation of a machine learning-based anomaly detection process 400, according to one embodiment of the disclosure. As shown in FIG. 4, the exemplary machine learning-based anomaly detection process 400 initially learns the individual time-series models for each distinct feature within the data during step 405. It is noted that the training process of step 405 is optional in the sense that it may be performed by another entity and be provided as an input to the exemplary machine learning-based anomaly detection process 400. The output from these learned models will be the input to the baseline behavioral model that combines the output from all of the time-series models in some embodiments to produce a probability score.

Thereafter, the exemplary machine learning-based anomaly detection process 400 obtains data from multiple data sources associated with a monitored location during step 410 for storage into a data repository. Thereafter, the data is processed during step 420 to generate time-series data (e.g., substantially continuous time-series data) for multiple distinct features within the data.

During step 430, the exemplary machine learning-based anomaly detection process 400 applies the time-series data for the distinct features to at least one machine learning baseline behavioral model to obtain a probability distribution representing a behavior of the monitored location over time. For example, in one or more embodiments, the output from each of the time-series models (e.g., the difference between the predicted and the measured value of the particular feature at the current time stamp) is an input to the aggregated model.

Finally, the machine learning-based anomaly detection process 400 evaluates a probability score generated by the at least one machine learning baseline behavioral model during step 440 to identify an anomaly at the monitored location. For example, the probability score may comprise an indication of a likelihood of an intrusion or another anomaly at the monitored location.

Among other benefits, the disclosed machine learning-based anomaly detection techniques process data comprising, for example, sensor data from multiple existing sensors, as well as image and feature data from cameras and other devices using machine learning modules. In this manner, the disclosed anomaly detection techniques can detect an anomaly in a monitored location with a lower data resolution (e.g., less data and less computational needs), which thereby allows an implementation at the edge of the Internet, or otherwise closer to the monitored location (further reducing the latency and communication costs).

Unlike traditional solutions, the disclosed anomaly detection techniques can be performed in a substantially continuous manner (e.g., 24 hours a day and seven days a week) as the disclosed machine learning-based anomaly detection techniques learn the baseline behavior (e.g., in the form of machine learning models for each feature) and can then optionally alert on anomalies, or implement other predefined remedial actions.

During an exemplary training phase, the exemplary machine learning-based anomaly detection system 100 is subject to data arriving when people are in and out of the monitored location. In this manner, the exemplary machine learning-based anomaly detection system 100 will alert only on those occasions when an "unexpected" entity enters the monitored location (e.g., an unexpected occupant) that is not normally present for the indicated time. In addition, since the exemplary machine learning-based anomaly detection system 100 can operate in a substantially continuous manner, there is no need to switch the system 100 on or off (e.g., in some embodiments, it is not recommended to turn the system 100 off, in order to acquire more data). In this manner, users can avoid issues such as forgetting to operate the system, as well as false alarms when residents are asleep, for example. If the disclosed machine learning system is trained using data incorporating images of an owner or other expected occupants (e.g., motion patterns, mobile, heart rhythm and more), and an expected occupant enters the home at a different time than expected by the model, the system can be trained to not treat this occurrence as an anomaly, since the expected occupant is known (e.g., is a trusted individual).

In existing face and/or identity recognition models, a specific face needs to be identified out of a large number of possibilities. For the present use case, it is sufficient to identify that something unpredictable is occurring. Thus, instead of answering "who is the specific person?," the disclosed techniques answer the following question: "Is there an anomaly in the spatial-temporal properties at this specific point in time?" In order to answer this question, numerous human properties are considered (human properties are, for example, environmental changes affected either by a human presence itself (static properties) or voluntary human motion (dynamic properties)). For example, presence considers whether there is there at least one person present, while a count indicates how many people are present, and a location indicates whether the person present is where he or she is expected to be.

Models incorporating such low-level attributes are significantly "lighter" than Deep Learning models, as would be apparent to a person of ordinary skill in the art, as they are required to reach a much lower level of resolution of identification. As such, the employed exemplary machine learning models can be executed at the edge of the Internet, for example (e.g., at a customer location).

In one or more embodiments, a baseline model is trained based on the data arriving from the system in a normal state, which is assumed to be in place most of the time. The solution learns the time patterns and seasonality of the "allowed" personnel or occupants at the monitored location. For example, the machine learning models will learn that the cleaning lady normally arrives each week on a given day, at a given time. Likewise, if the protected premise is entered by a service provider outside of his or her usual working hours (e.g., every week on Thursday from 15:00-16:00), a disruption in the learned seasonality will be identified as an anomaly (even though the visual image is familiar to the disclosed system) and the alert will be triggered.

The applied multi-dimensional probability distribution function is optionally calculated over the dynamics and correlations among observable properties within the monitored location. In this manner, alerts are set on non-trivial anomalies once the combination of monitored features drift from the distribution's center of mass.

In some embodiments, the identified anomalies capture a divergence/unexpected occurrence in the monitored location, taking multiple properties into account. This is achieved, for example, by constructing a machine learning or artificial intelligence-based model, integrating all IoT sensor information collected within the monitored location that removes (or reduces) the need to directly monitor and alert on each sensor individually. As a result, the disclosed machine learning solution is more accurate and encounters less false positive and false negative alarms than traditional solutions that only consider individual features. For example, if there is a pet in the monitored location, the machine learning model(s) will learn to incorporate the presence of the pet as part of the baseline behavior (and therefore not set off the anomaly alarm).

One or more embodiments of the disclosure provide improved methods, apparatus and computer program products for machine learning-based anomaly detection. The foregoing applications and associated embodiments should be considered as illustrative only, and numerous other embodiments can be configured using the techniques disclosed herein, in a wide variety of different applications.

It should also be understood that the disclosed multi-model anomaly detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for machine learning-based anomaly detection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based anomaly detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
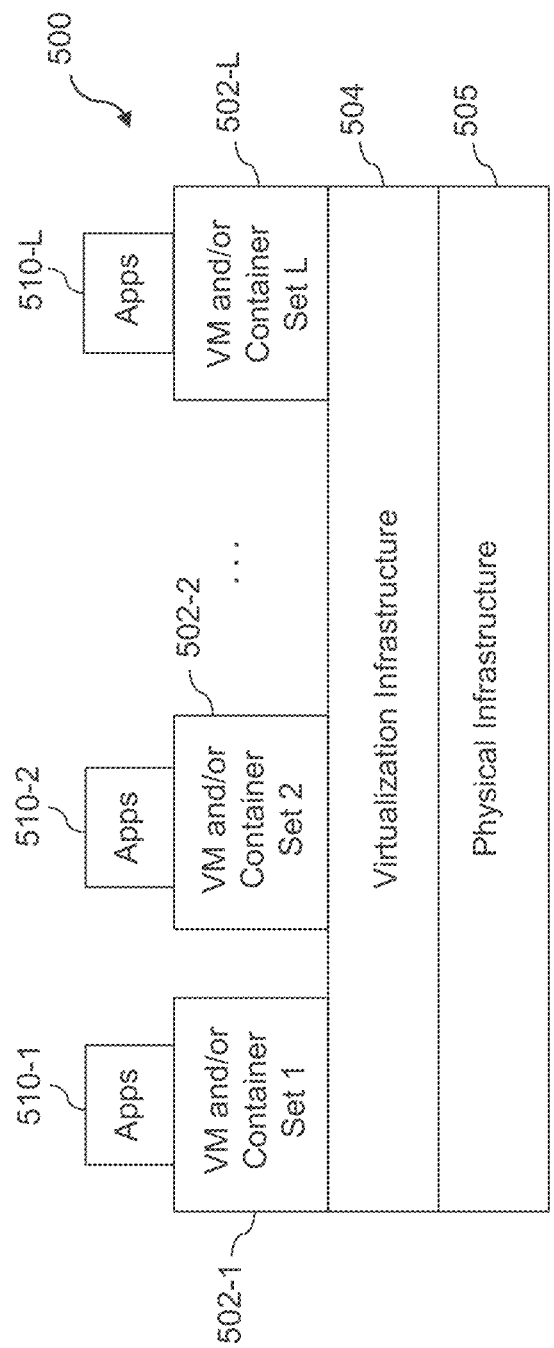
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system described herein. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide anomaly detection functionality of the type described above for one or more processes running on a given one of the VMs. For example, each of the VMs can implement anomaly detection control logic and associated machine learning models for detecting anomalies in a monitored location for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide anomaly detection functionality of the type described above for one or more processes running on different ones of the containers. For example, a container host device supporting multiple containers of one or more container sets can implement one or more instances of anomaly detection control logic and associated machine learning models for detecting anomalies in a monitored location.

As is apparent from the above, one or more of the processing modules or other components of machine learning-based anomaly detection system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
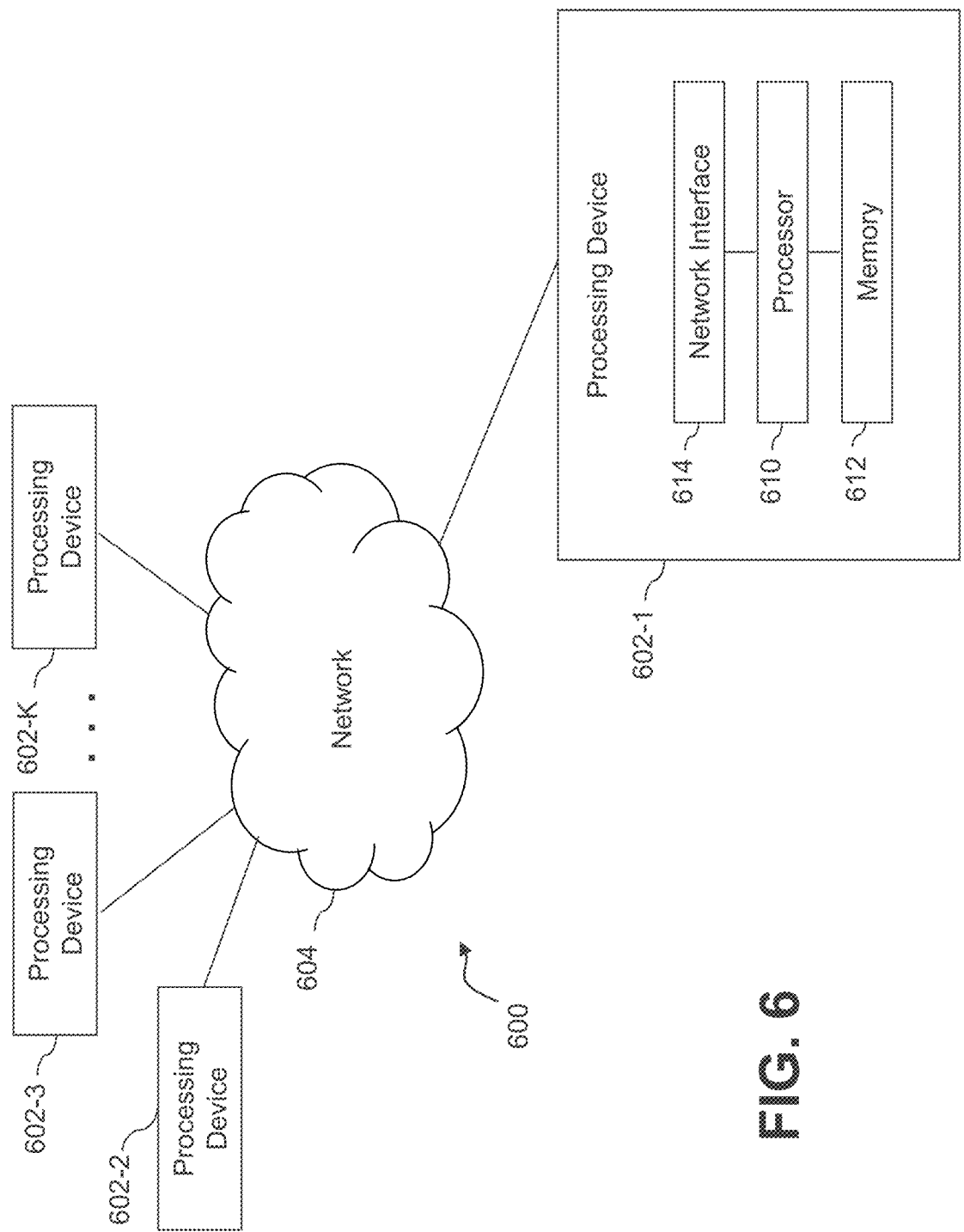
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining data from a plurality of data sources associated with a monitored physical location for storage into a data repository;
   processing the data to generate substantially continuous time-series data for a plurality of distinct features within the data;
   applying the substantially continuous time-series data for the plurality of distinct features to at least one machine learning baseline behavioral model to obtain a probability distribution representing a behavior of the monitored physical location over time, wherein the at least one machine learning baseline behavioral model is trained to learn a baseline behavior comprising one or more expected times of at least one expected occupant at the monitored physical location, wherein an unexpected occupant at the monitored physical location at a given time is identified based on a deviation of the unexpected occupant at the monitored physical location at the given time from the learned one or more expected times of the at least one expected occupant at the monitored physical location in the at least one machine learning baseline behavioral model, and wherein the probability distribution comprises a multi-dimensional probability distribution representing one or more human properties, wherein the multi-dimensional probability distribution takes into account (i) a temporal pattern behavior of each of the plurality of distinct features related to the one or more human properties and (ii) temporal correlations between feature values of at least two of the plurality of distinct features, related to the one or more human properties, at each timestamp, wherein the at least one machine learning baseline behavioral model is further trained to treat a presence of a given expected occupant at the monitored physical location at a different time than the one or more expected times for the given expected occupant as a non-anomalous event; and
   evaluating a probability score generated by the at least one machine learning baseline behavioral model to identify an anomaly at the monitored physical location;
   wherein the method is performed by at least one processing device comprising a processor coupled to a memory.

2. The method of claim 1, wherein the plurality of data sources comprises one or more of sensor devices at the monitored location, physiological sensor devices for one or more humans at the monitored location, a network device associated with the monitored location and a smart appliance at the monitored location.

3. The method of claim 1, wherein the substantially continuous time-series data for the plurality of distinct features is applied to the at least one machine learning baseline behavioral model as a data vector with a value for each distinct feature for a given timestamp.

4. The method of claim 1, wherein the step of evaluating the probability score further comprises comparing the probability score to one or more predefined thresholds.

5. The method of claim 1, wherein the step of evaluating the probability score further comprises the step of evaluating the probability score for each of the distinct features.

6. The method of claim 1, wherein the processing step further comprises applying at least one function to the data to obtain a plurality of time-series counters for the plurality of distinct features within the data.

7. The method of claim 1, wherein the applying the substantially continuous time-series data for the plurality of distinct features to the at least one machine learning baseline behavioral model comprises applying a difference, between a predicted value of a given feature by a given machine learning baseline behavioral model and a measured value of the given feature, to an aggregate model.

8. The method of claim 1, wherein the temporal pattern behavior of each of the plurality of distinct features is used to identify at least one anomaly in one or more of a given distinct feature and a plurality of the distinct features.

9. The method of claim 1, wherein the at least one machine learning baseline behavioral model comprises a different machine learning model for each of the plurality of distinct features within the data and an additional aggregated machine learning model that aggregates an output of each of the different machine learning models for each of the plurality of distinct features.

10. A computer program product, comprising a tangible machine-readable storage medium having encoded therein executable code of one or more software programs, wherein the one or more software programs when executed by at least one processing device perform the following steps:
    obtaining data from a plurality of data sources associated with a monitored physical location for storage into a data repository;

processing the data to generate substantially continuous time-series data for a plurality of distinct features within the data;

applying the substantially continuous time-series data for the plurality of distinct features to at least one machine learning baseline behavioral model to obtain a probability distribution representing a behavior of the monitored physical location over time, wherein the at least one machine learning baseline behavioral model is trained to learn a baseline behavior comprising one or more expected times of at least one expected occupant at the monitored physical location, wherein an unexpected occupant at the monitored physical location at a given time is identified based on a deviation of the unexpected occupant at the monitored physical location at the given time from the learned one or more expected times of the at least one expected occupant at the monitored physical location in the at least one machine learning baseline behavioral model, and wherein the probability distribution comprises a multi-dimensional probability distribution representing one or more human properties, wherein the multi-dimensional probability distribution takes into account (i) a temporal pattern behavior of each of the plurality of distinct features related to the one or more human properties and (ii) temporal correlations between feature values of at least two of the plurality of distinct features, related to the one or more human properties, at each timestamp, wherein the at least one machine learning baseline behavioral model is further trained to treat a presence of a given expected occupant at the monitored physical location at a different time than the one or more expected times for the given expected occupant as a non-anomalous event; and evaluating a probability score generated by the at least one machine learning baseline behavioral model to identify an anomaly at the monitored physical location.

11. The computer program product of claim 10, wherein the substantially continuous time-series data for the plurality of distinct features is applied to the at least one machine learning baseline behavioral model as a data vector with a value for each distinct feature for a given timestamp.

12. The computer program product of claim 10, wherein the step of evaluating the probability score further comprises the step of evaluating the probability score for each of the distinct features.

13. The computer program product of claim 10, wherein the applying the substantially continuous time-series data for the plurality of distinct features to the at least one machine learning baseline behavioral model comprises applying a difference, between a predicted value of a given feature by a given machine learning baseline behavioral model and a measured value of the given feature, to an aggregate model.

14. The computer program product of claim 10, wherein the at least one machine learning baseline behavioral model comprises a different machine learning model for each of the plurality of distinct features within the data and an additional aggregated machine learning model that aggregates an output of each of the different machine learning models for each of the plurality of distinct features.

15. An apparatus, comprising:
a memory; and
at least one processing device, coupled to the memory, operative to implement the following steps:
obtaining data from a plurality of data sources associated with a monitored physical location for storage into a data repository;
processing the data to generate substantially continuous time-series data for a plurality of distinct features within the data;

applying the substantially continuous time-series data for the plurality of distinct features to at least one machine learning baseline behavioral model to obtain a probability distribution representing a behavior of the monitored physical location over time, wherein the at least one machine learning baseline behavioral model is trained to learn a baseline behavior comprising one or more expected times of at least one expected occupant at the monitored physical location, wherein an unexpected occupant at the monitored physical location at a given time is identified based on a deviation of the unexpected occupant at the monitored physical location at the given time from the learned one or more expected times of the at least one expected occupant at the monitored physical location in the at least one machine learning baseline behavioral model, and wherein the probability distribution comprises a multi-dimensional probability distribution representing one or more human properties, wherein the multi-dimensional probability distribution takes into account (i) a temporal pattern behavior of each of the plurality of distinct features related to the one or more human properties and (ii) temporal correlations between feature values of at least two of the plurality of distinct features, related to the one or more human properties, at each timestamp, wherein the at least one machine learning baseline behavioral model is further trained to treat a presence of a given expected occupant at the monitored physical location at a different time than the one or more expected times for the given expected occupant as a non-anomalous event; and evaluating a probability score generated by the at least one machine learning baseline behavioral model to identify an anomaly at the monitored physical location.

16. The apparatus of claim 15, wherein the substantially continuous time-series data for the plurality of distinct features is applied to the at least one machine learning baseline behavioral model as a data vector with a value for each distinct feature for a given timestamp.

17. The apparatus of claim 15, wherein the step of evaluating the probability score further comprises the step of evaluating the probability score for each of the distinct features.

18. The apparatus of claim 15, wherein the processing step further comprises applying at least one function to the data to obtain a plurality of time-series counters for the plurality of distinct features within the data.

19. The apparatus of claim 15, wherein the applying the substantially continuous time-series data for the plurality of distinct features to the at least one machine learning baseline behavioral model comprises applying a difference, between a predicted value of a given feature by a given machine learning baseline behavioral model and a measured value of the given feature, to an aggregate model.

20. The apparatus of claim 15, wherein the at least one machine learning baseline behavioral model comprises a different machine learning model for each of the plurality of distinct features within the data and an additional aggregated machine learning model that aggregates an output of each of the different machine learning models for each of the plurality of distinct features.

* * * * *